United States Patent [19]
Zucker

[11] Patent Number: 5,802,029
[45] Date of Patent: Sep. 1, 1998

[54] REPRODUCTION AND/OR RECORDING DEVICE FOR OPTICAL RECORDING MEDIA OF VARYING STORAGE DENSITY

[75] Inventor: Friedhelm Zucker, Villingen-Schwenningen, Germany

[73] Assignee: Deutsche Thomson Brandt GmbH, Germany

[21] Appl. No.: 686,286

[22] Filed: Jul. 25, 1996

[30] Foreign Application Priority Data

Sep. 29, 1995 [DE] Germany .......... 195 36 396.5

[51] Int. Cl.$^6$ .......... G11B 7/00
[52] U.S. Cl. .......... 369/58; 369/44.42; 369/44.29
[58] Field of Search .......... 369/48, 47, 58, 369/32, 112, 94, 44.29, 44.27, 44.28, 44.32, 44.37, 44.41, 44.42

[56] References Cited

U.S. PATENT DOCUMENTS

| | | | |
|---|---|---|---|
| 5,097,464 | 3/1992 | Nishiuchi et al. | 369/112 |
| 5,210,730 | 5/1993 | Hayashi et al. | 369/112 |
| 5,367,512 | 11/1994 | Satou et al. | 369/44.23 |
| 5,446,565 | 8/1995 | Komma et al. | 369/94 |
| 5,633,853 | 5/1997 | Kim et al. | 369/112 |

FOREIGN PATENT DOCUMENTS

| | | |
|---|---|---|
| 0562158 | 9/1993 | European Pat. Off. . |
| 0589611 | 3/1994 | European Pat. Off. . |

*Primary Examiner*—Nabil Hindi
*Attorney, Agent, or Firm*—Joseph A. Tripoli; Frederick A. Wein

[57] ABSTRACT

A reproduction and/or recording device for optical recording media which is compatible in respect of varying storage density, despite an interdependence between pit or domain size, and the light spot size. Use is made of a track guidance signal generation device which can be changed over according to the storage density type and is connected to a detector which can be used for recording media of varying storage density, i.e. in the form of the standardized CD, minidisk or MOD, and for optical recording media, which have a comparatively higher information storage density, or smaller track spacings and smaller dimensions of the pits or storage structures.

2 Claims, 3 Drawing Sheets

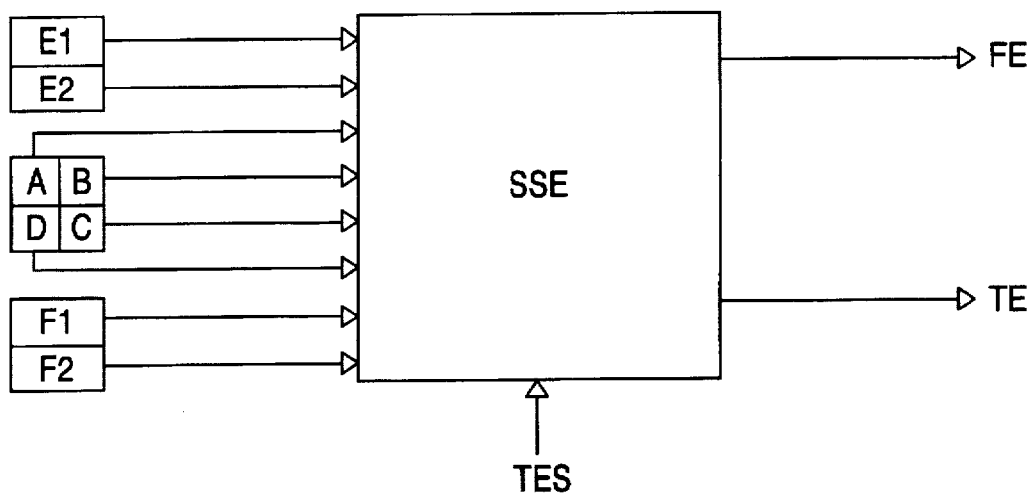
FIG. 1
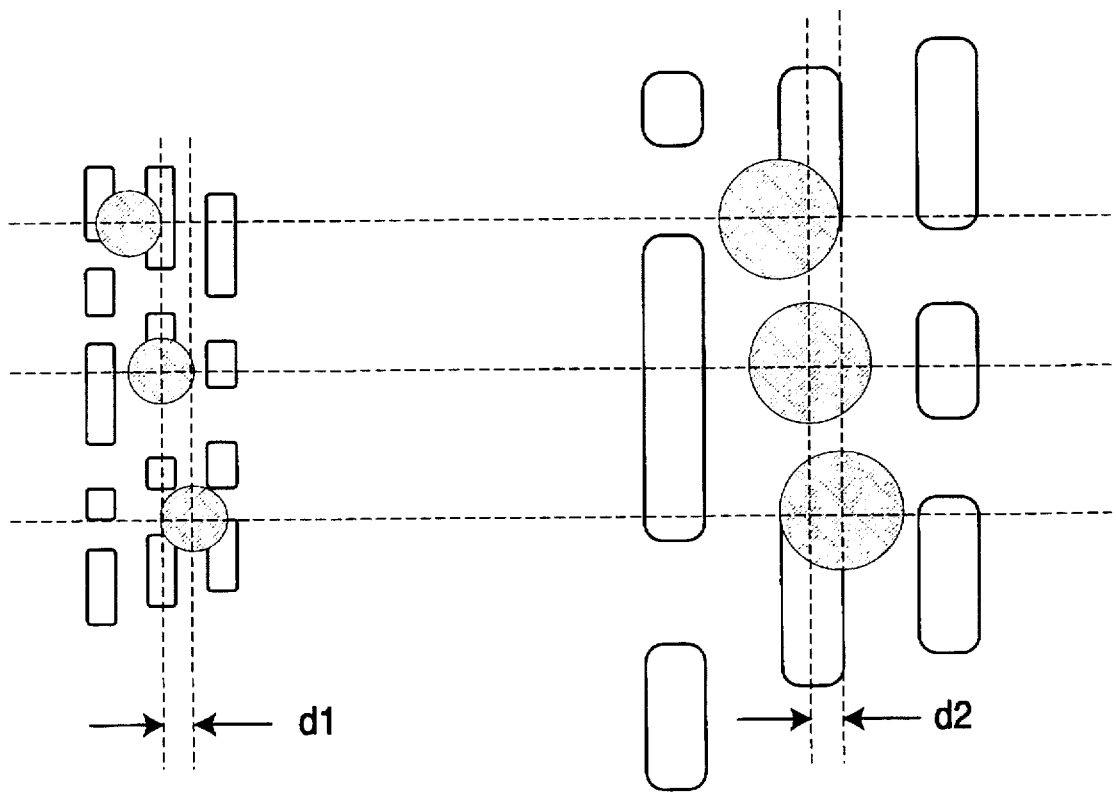
FIG. 2  FIG. 3

REPRODUCTION AND/OR RECORDING DEVICE FOR OPTICAL RECORDING MEDIA OF VARYING STORAGE DENSITY

BACKGROUND

The invention relates to reproduction and/or recording devices for optical recording media of varying storage density for the reproduction of information from and/or recording onto optical recording media having a varying information storage density. The reproduction and/or recording device enables both the reproduction of information from and/or the recording onto previously customary optical recording media in the form of the standardized audio CD, minidisk or MOD and from and/or onto optical recording media which have a comparatively higher information storage density, such as, for example, a digital videodisk or super density disk. Recording media of comparably higher storage density then generally have smaller track spacings and smaller dimensions of the pits or storage structures.

Information is recorded on the CD or compact disk in digital form as a spiral track of successive depressions, the so-called pits. The track spacing of optical recording media of the present standard is 1.6 µm and the pits have a width of 0.6 µm and a depth of 0.12 µm, and the length of a pit or the spacing between two pits varies in the range between 0.9 and 3.3 µm., cf. Philips tech. Rev. 40, 1982, No. 6, p. 156. These standard values also apply to the minidisk. The higher storage capacity of the minidisk is achieved not by a higher storage density of the recording medium but by compressing the information prior to recording. In respect of the structure of the recording medium, the minidisk corresponds to the CD standard values, so that corresponding playback devices do not differ in respect of the laser used and in respect of the scanning device. However, there are natural limits to data compression without loss of information, so that the aim is to increase the storage capacity of the recording medium. However, this necessitates a smaller track spacing and/or pits having smaller dimensions. Consequently, playback devices of a new type are also required, which enable the optical scanning of and the reproduction of information from recording media of higher storage density. The optical scanning and/or recording of pits having smaller dimensions and having a smaller track spacing require the laser beam to be focused on the CD with a smaller light spot size. In this case, the size of the light spot is determined both by the numerical aperture of the objective lens and by the wavelength of the laser light. Lasers used at present have a wavelength of 780 nm. However, lasers are already known which provide light having a wavelength of only 635 nm. A quantitative leap is expected of optical frequency doublers, so-called Second Harmonic Generator Crystals. They permit a halving of the wavelength. The power loss occurring here can be compensated for by a higher laser power.

However, the use of a smaller light spot or of a light source having a smaller wavelength for scanning optical recording media would have the effect that recording media of the present CD standard could not be played back using devices of this type. The reason for this is the principle of destructive interference used for scanning. The principle of destructive interference consists in achieving optical scanning of the pits, which are formed merely by depressions in a uniformly reflective layer, by focusing the scanning light spot in such a way that the light component reflected outside a pit is approximately equal to the light component reflected from the depression and the light components interfere destructively with one another, with the result that an attenuation of the intensity can be evaluated as the scanning signal. There is an interdependence to be observed between the pit or storage structure size and the light spot size.

This also applies in part to a magneto-optical recording medium, the so-called MOD, in which the storage and/or reproduction of information is essentially based on rotating the polarization direction of the light. Although the relationship between the size of magnetic domains and the light spot size does not have to be observed with the accuracy applying to pits, a certain interdependence has to be taken into account in this case, too, with recording media of varying storage density, in particular in respect of recording media having a reduced track spacing.

SUMMARY OF THE INVENTION

The object of the invention, therefore, is to provide a reproduction and/or recording device for optical recording media of varying storage density.

A reproduction and/or recording device for optical recording media is specified which permits the use, in only one device, both of; recording media having a storage density corresponding to the present standard and of recording media of higher storage density. This is achieved with a reproduction and/or recording device which has a scanning device whose detectors for generating the control and regulating signals required for the storage density type of the recording medium are interconnected in different combinations in the reproduction and/or recording device. In order, for example, to be able to play back both a digital videodisk of high storage density and a customary audio CD having a low storage density in the same device, use is made of a detector system comprising six individual detectors or photoelements, the photodetectors being interconnected in accordance with the storage density type of the recording medium. With only one detector arrangement, different track guidance systems are then realized using a track guidance signal generation device which can be changed over. In the aforementioned example, both the differential push-pull used for the track guidance of a digital videodisk and the standard three-beam system used for the track guidance of an audio CD are realized using only one detector system. For this purpose, corresponding circuit arrangements for track error generation are provided in the track guidance signal generation device and are connected to the track control loop in accordance with the storage density type of the recording medium. As a result, recording media of varying storage density can advantageously be used in one device with only one detector system. Matching the device to the storage density type of the recording medium is done with a changeover switch, by which the required circuit arrangement for track error signal generation is selected.

Although a light spot size to be adapted to the storage density type of the recording medium or different light spot sizes are required for scanning the recording medium, only one detector arrangement is required. In order nevertheless to keep ready track guidance signals required for the storage density type, the track guidance signal generation device which can be changed over is provided.

The interdependence existing between the storage element size and the light spot size is observed with a double-focus lens or multiple-focus lens as the objective lens, even with a varying size of the storage elements or pits. The distance between the auxiliary beams is influenced only insignificantly by the focusing, with the result that the auxiliary beams which are aligned with the edge of the pits in the three-beam method scan the recording medium between the pits instead of on the edge of the pits given a smaller track spacing of the recording medium of higher storage density. Since the mutual geometrical position of the scanning light spots changes only insignificantly despite a varying light spot size, one detector arrangement can advantageously be used for different light spot sizes or recording media of varying storage density.

The varying impingement of the auxiliary light spots—on the edge of the pits or between the pits requires a special type of track guidance signal generation or track error signal generation which is advantageously realized, however, by an electronic circuit which can be changed over appropriately and is formed by the track guidance signal generation device. Use is made neither of a laser providing light of a different wavelength nor of a different scanning system. Consequently, advantageously compatible reproduction and/or recording devices can be produced which are suitable for operation with recording media of varying storage density.

BRIEF DESCRIPTION OF THE DRAWING(S)

The invention is explained in more detail below using an exemplary embodiment with reference to the drawings, in which:

FIG. 1 shows a schematic sketch of the photodetector arrangement and track guidance signal generation device of a reproduction and/or recording device for recording media of varying storage density, FIG. 2 shows a schematic sketch of light spot imaging when scanning high storage density, FIG. 3 shows a schematic sketch of light spot imaging when scanning high storage density, FIG. 4 shows a schematic sketch of a circuit arrangement for track error signal generation, FIG. 5 shows a schematic sketch of a circuit arrangement for focus error signal generation, and FIG. 6 shows a schematic sketch of a scanning device of a reproduction and/or recording device for recording media of varying storage density.

DESCRIPTION OF THE PREFERRED EMBODIMENT(S)

Figures 4, 5:
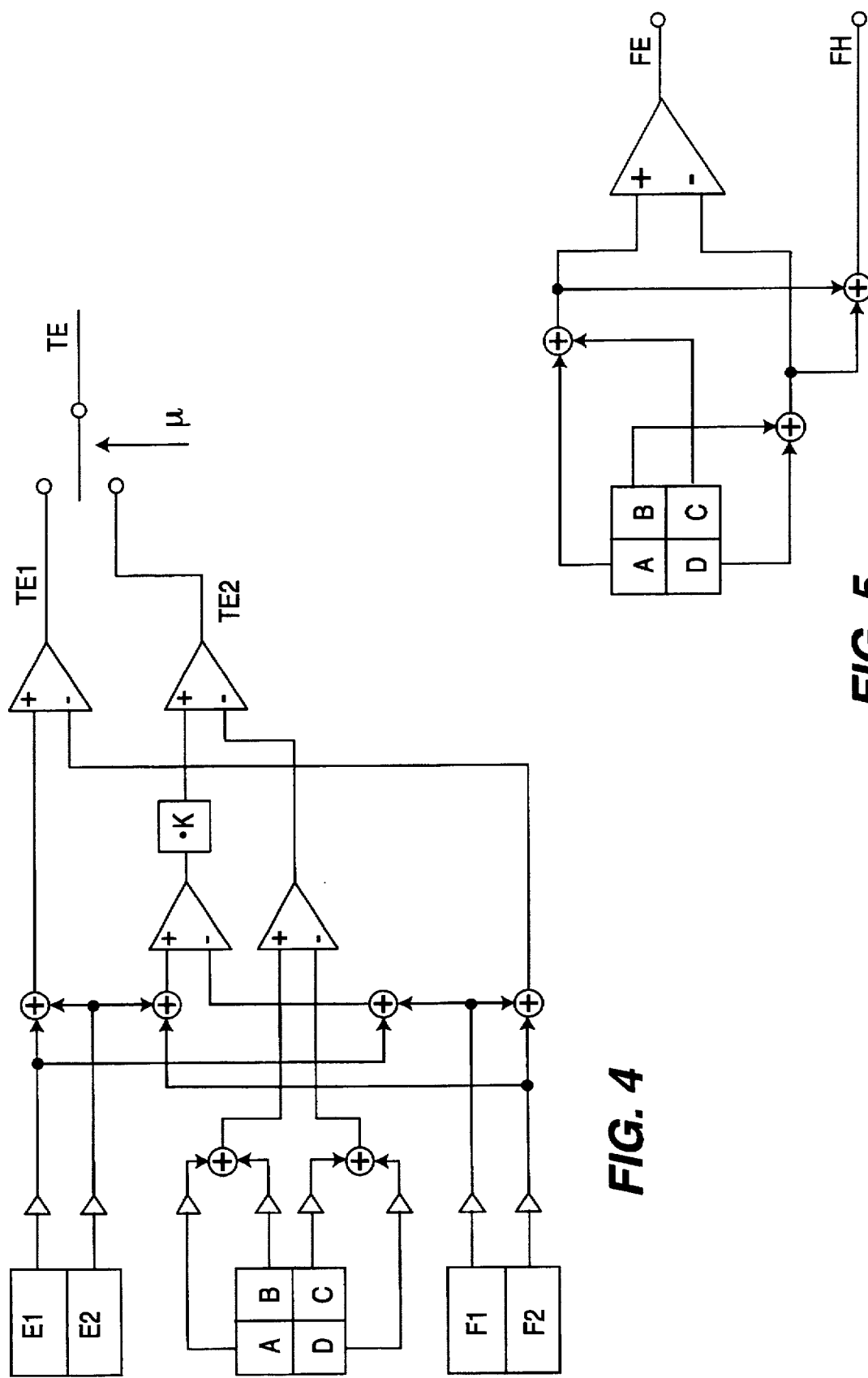
Figure 6:
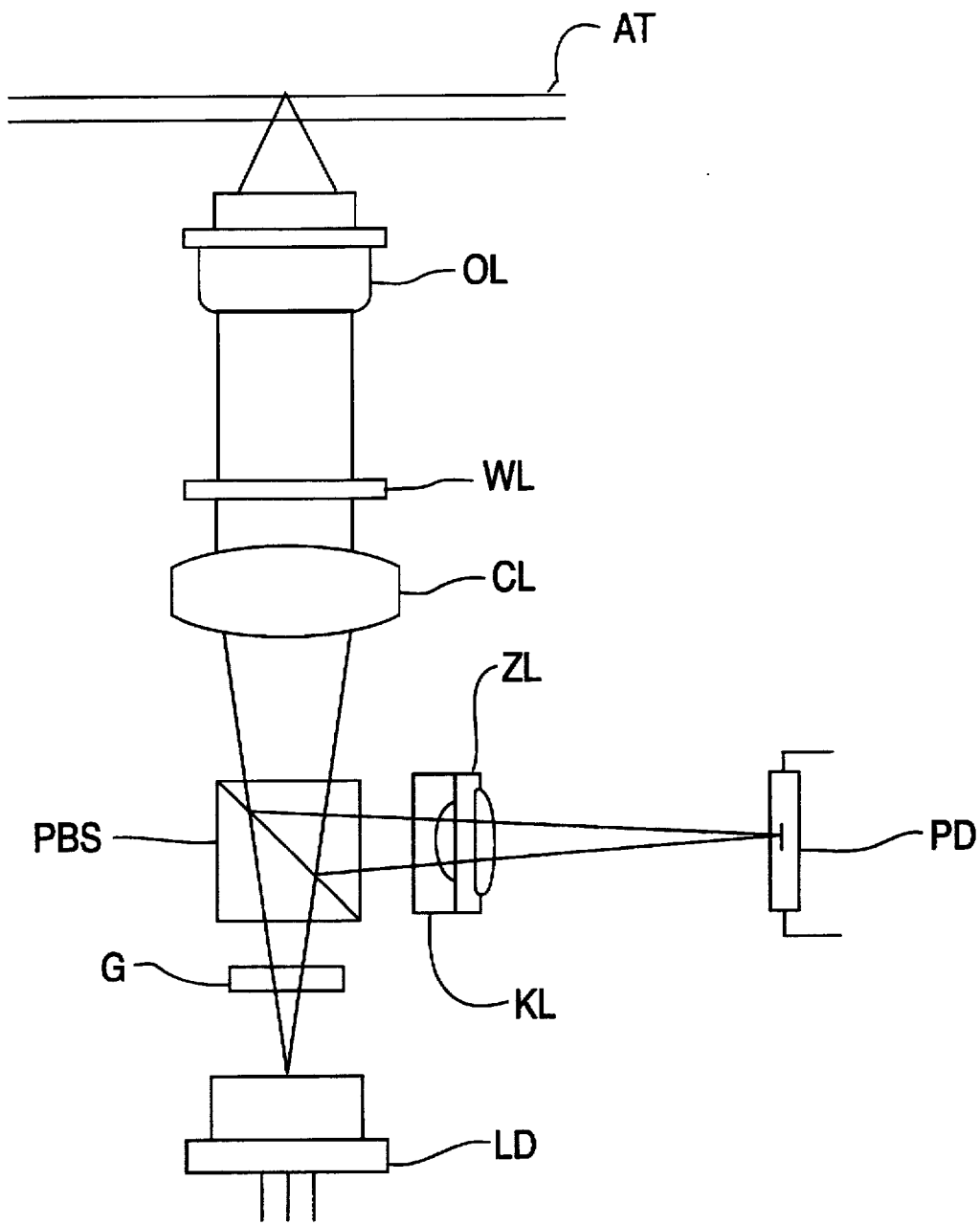

According to the schematic sketch, illustrated in FIG. 6, of a reproduction and/or recording device for optical recording media AT of varying storage density, use is made, in a reproduction and/or recording device which is provided both for playing back audio CDs and for playing back digital videodisks, of a scanning device which, in accordance with FIG. 6, comprises a laser diode LD, a grating G, a polarization beam splitter PBS, a collimator lens CL, a quarter-wave plate WL, an objective lens OL, a concave lens KL, a cylindrical lens ZL and a detector PD. Although the digital videodisk, referred to as DVD below, and an audio disk, referred to as CD below, have a different storage density, the scanning unit illustrated in FIG. 6 can be used equally for both types of recording media AT. The higher storage density in a DVD is achieved by a smaller pit size and a reduced track spacing in comparison with the CD. A corresponding comparison is illustrated in FIGS. 2 and 3. In order to reproduce the information stored on a recording medium AT or to record corresponding information, it is necessary to adapt the diameter of the scanning beam or writing beam to the size of the storage elements or pits used. In order that both the smaller pits of a DVD and the larger pits of a CD can be read by the scanning device indicated in FIG. 6, the objective lens OL is designed as a double-focus lens. Different light spot diameters can be realized on the information medium AT by means of the double-focus lens or, alternatively, a multiple-focus lens. Despite the different light spot diameters, the position of the auxiliary beams produced by the grating G illustrated in FIG. 6 with respect to the main beam and with respect to one another is changed only slightly. The distances d1, d2, indicated in FIG. 2 and FIG. 3, between the auxiliary light spot and the main light spot are approximately identical. As a result, despite different light spot diameters, use can advantageously be made of one detector PD, which comprises an arrangement of photodetectors which is illustrated in FIG. 1. In accordance with FIG. 1, there are provided a four-quadrant detector having the photoelements A, B, C, D for main beam detection, as well as two divided auxiliary beam detectors having the photoelements E1, E2 and F1, F2. This detector arrangement is advantageously used both for recording media AT of high storage density and of low storage density. As is evident in FIGS. 2 and 3, the auxiliary beams impinge on the recording medium AT on the edge of the pits in the case of a CD and between the pits in the case of a DVD. The different position of the auxiliary beams with respect to the pits requires the use of different methods for track guidance. While the focus error signal FE according to the equation FE=(A+C)−(B+D) can be used equally for recording media AT of varying storage density, the track error signal TE must be formed in accordance with the storage density type. For the track guidance of a recording medium AT of low storage density, the track error signal TE is formed according to the equation TE=(E1+E2)−(F1+F2). For the recording medium of higher storage density, however, the track error signal TE must be formed according to the equation TE=(A+B)−(C+D)k*((E1+F1)−(E2+F2)). Provided for this purpose is, a track guidance signal generation device SSE which, according to FIG. 1, is connected to the photodetectors A, B, C, D, E1, E2, F1, F2. The combinations specified in the above equations are realized using the circuit arrangements indicated in FIG. 4 and FIG. 5. In order to be able to scan recording media AT of varying storage density with only one scanning device, the circuit arrangement, corresponding to the storage density type, for track error signal generation TE1 or TE2 is connected to the track control loop via a changeover switch U. For this purpose, a changeover signal TES is fed to the track guidance signal generation device SSE. The changeover signal can either be input manually or be generated by a circuit arrangement for identifying the storage density type.

The application of the invention is not restricted to the embodiments specified here, rather it is possible in general terms in the context of optical information media based on the principle specified.

I claim:

1. Reproduction and/or recording device for optical recording media of varying storage comprising:
   a track guidance signal generation device which can be changed according to the storage density type,
   the track guidance signal generation device means for generating a track error signal generation (TE) according to the equation TE=(A+B)−(C+D)−k*((E1+F1)−(E2+F2)), and means for generating a track error signal generation according to the equation TE=(E1+E2)−(F1+F2), which are connected to a track control loop via a changeover switch in accordance with the storage density type of the optical recording medium,
   where E1 and E2 are photoelements of a first divided auxiliary beam detector, A, B, C, and D are photoelements of a four-quadrant detector, and F1 and F2 are photoelements of a second divided auxiliary beam detector.

2. Reproduction and/or recording device according to claim 1 wherein the track guidance signal generation device is changed over by a signal which corresponds to the storage density type, and is inputted manually and/or is generated by a circuit means for identifying the storage density type of the optical recording medium.

* * * * *